United States Patent
Larson et al.

(10) Patent No.: US 10,450,967 B2
(45) Date of Patent: Oct. 22, 2019

(54) METHOD FOR THE OPERATION OF A GAS TURBINE BY ACTIVE HYDRAULIC GAP ADJUSTMENT

(71) Applicant: Siemens Aktiengesellschaft, Munich (DE)

(72) Inventors: Marco Larson, Mülheim (DE); Nicolas Savilius, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 346 days.

(21) Appl. No.: 15/118,214

(22) PCT Filed: Feb. 12, 2015

(86) PCT No.: PCT/EP2015/052909
§ 371 (c)(1),
(2) Date: Aug. 11, 2016

(87) PCT Pub. No.: WO2015/128193
PCT Pub. Date: Sep. 3, 2015

(65) Prior Publication Data
US 2017/0184033 A1    Jun. 29, 2017

(30) Foreign Application Priority Data
Feb. 25, 2014 (DE) .................. 10 2014 203 318

(51) Int. Cl.
*F02C 9/48* (2006.01)
*F01D 5/02* (2006.01)
(Continued)

(52) U.S. Cl.
CPC .................. *F02C 9/54* (2013.01); *F01D 5/02* (2013.01); *F01D 9/041* (2013.01); *F01D 11/22* (2013.01);
(Continued)

(58) Field of Classification Search
CPC .......... F01D 11/20; F01D 11/22; F01D 11/24; F01D 11/14; F01D 9/041; F01D 17/162;
(Continued)

(56) References Cited

U.S. PATENT DOCUMENTS 3,085,398 A * 4/1963 Ingleson .................. F01D 11/22
415/127
3,956,883 A * 5/1976 Anderson ................ F01D 19/00
60/790
(Continued)

FOREIGN PATENT DOCUMENTS

| CN | 101660431 A | 3/2010 |
| CN | 101660508 A | 3/2010 |

(Continued)

OTHER PUBLICATIONS

IPRP (PCT/IPEA/416), dated Apr. 28, 2016, for PCT application No. PCT/EP2015/052909.
(Continued)

*Primary Examiner* — Alain Chau
(74) *Attorney, Agent, or Firm* — Beusse Wolters Sanks & Maire

(57) ABSTRACT

A method for operating a stationary gas turbine at partial load, having at least one compressor, at least one expansion turbine and a combustion chamber provided with at least one burner, which gas turbine further includes a hydraulic gap adjuster, wherein the method has the following steps: operating the gas turbine at partial load; operating the a hydraulic gap adjuster; during the operation of the hydraulic gap adjuster, increasing the fuel supply to the burner while increasing the temperature of the combustion gases which are guided to the expansion turbine.

6 Claims, 1 Drawing Sheet

(51) Int. Cl.
  *F01D 9/04* (2006.01)
  *F02C 3/04* (2006.01)
  *F02C 9/54* (2006.01)
  *F01D 11/22* (2006.01)
  *F01D 17/16* (2006.01)
  *F01D 25/24* (2006.01)

(52) U.S. Cl.
  CPC .......... *F01D 17/162* (2013.01); *F01D 25/24* (2013.01); *F02C 3/04* (2013.01); *F02C 9/48* (2013.01); *F05D 2220/32* (2013.01); *F05D 2240/35* (2013.01); *F05D 2250/34* (2013.01); *F05D 2260/406* (2013.01); *F05D 2270/07* (2013.01); *F05D 2270/303* (2013.01); *F05D 2270/64* (2013.01)

(58) Field of Classification Search
  CPC .... F01D 25/24; F01D 5/02; F02C 9/48; F02C 9/54; F02C 9/28; F02C 9/26; F02C 3/04
  See application file for complete search history.

(56) References Cited

U.S. PATENT DOCUMENTS

| | | | | |
|---|---|---|---|---|
| 4,967,552 A * | 11/1990 | Kumata | .................... | F01D 5/08 415/115 |
| 5,012,420 A * | 4/1991 | Walker | .................... | F01D 11/24 415/1 |
| 5,090,193 A * | 2/1992 | Schwarz | ................. | F01D 11/24 60/782 |
| 7,407,369 B2 * | 8/2008 | Schwarz | ............... | F01D 11/122 415/127 |
| 8,449,243 B2 * | 5/2013 | Fiala | ......................... | F01D 3/04 415/105 |
| 8,540,479 B2 * | 9/2013 | Awtar | ................... | F01D 11/025 415/113 |
| 9,243,499 B2 * | 1/2016 | Braun | .................... | F01D 5/026 |
| 2001/0025481 A1 * | 10/2001 | Magoshi | ................. | F01D 11/24 60/39.182 |
| 2002/0009361 A1 * | 1/2002 | Reichert | ................. | F01D 11/22 415/110 |
| 2004/0255595 A1 | 12/2004 | Morgan et al. | | |
| 2005/0050901 A1 * | 3/2005 | Little | ........................ | F01D 5/08 60/785 |
| 2008/0243352 A1 * | 10/2008 | Healy | ..................... | F01D 17/00 701/100 |
| 2010/0054911 A1 | 3/2010 | Wilson et al. | | |
| 2010/0054912 A1 | 3/2010 | Wilson et al. | | |
| 2010/0247283 A1 | 9/2010 | Andrew et al. | | |
| 2010/0303612 A1 * | 12/2010 | Bhatnagar | ............... | F01D 11/22 415/127 |
| 2011/0138818 A1 | 6/2011 | Mizukami et al. | | |
| 2012/0177483 A1 | 7/2012 | Ali et al. | | |
| 2013/0125552 A1 * | 5/2013 | Shirooni | ................. | F01D 25/08 60/772 |
| 2013/0129478 A1 * | 5/2013 | Braun | ..................... | F01D 5/026 415/60 |
| 2013/0323016 A1 | 12/2013 | Javelot et al. | | |
| 2014/0193237 A1 * | 7/2014 | Reiter | ..................... | F01D 11/24 415/1 |
| 2015/0152743 A1 | 6/2015 | Luttenberg | | |

FOREIGN PATENT DOCUMENTS

| | | |
|---|---|---|
| CN | 101845972 A | 9/2010 |
| CN | 101899995 A | 12/2010 |
| CN | 103429851 A | 12/2013 |
| DE | 102012213016 A1 | 1/2014 |
| JP | 2010230004 A | 10/2010 |
| JP | 2010276019 A | 12/2010 |
| JP | 2012145102 A | 8/2012 |

OTHER PUBLICATIONS

DE Search Report, dated May 10, 2016, for DE application No. 102014203318.7.

International Search Report, dated Apr. 13, 2015, for PCT application No. PCT/EP2015/052909.

CN Office Action dated Mar. 3, 2017, for CN patent application No. 201580010250.6.

JP Office Action dated Sep. 25, 2017, for JP patent application No. 2016-553819.

Shen Cun-Wu et al, "Optimization Technology for Advanced Hydraulic Clearance of Gas Turbines", Thermal Turbine, vol. 39, No. 2, pp. 109-112, Jun. 2010, Shanghai China (English abstract included on p. one).

\* cited by examiner

METHOD FOR THE OPERATION OF A GAS TURBINE BY ACTIVE HYDRAULIC GAP ADJUSTMENT

CROSS REFERENCE TO RELATED APPLICATIONS

This application is the U.S. National Stage of International Application No. PCT/EP2015/052909 filed Feb. 12, 2015, and claims the benefit thereof. The International Application claims the benefit of German Application No. DE 102014203318.7 filed Feb. 25, 2014. All of the applications are incorporated by reference herein in their entirety.

FIELD OF INVENTION

The present invention relates to a method for operating a static gas turbine at partial load and with active hydraulic gap adjustment, and to such a gas turbine that is designed to employ such a method.

BACKGROUND OF INVENTION

In order to be able to operate gas turbines with improved efficiency or in order to increase power in particular during but also after start-up, it is advantageous to shift the gas turbine rotor counter to the main flow direction in the gas turbine. To that end, gas turbines preferably provide means for hydraulic gap adjustment that allow the gas turbine rotor to be shifted so as to set a smaller gap spacing between the turbine blade tips and the casing internal wall of the expansion turbine, and a corresponding larger gap spacing between the compressor blade tips and the casing internal wall of the compressor. Typically, the geometry of such gas turbines means that the losses arising in that context in the compressor are smaller than the increase in power in the expansion turbine due to the reduction in the gap spacing.

Changing the position of the gas turbine rotor in this way can normally be carried out only in a gas turbine that has been sufficiently warmed through. Otherwise, there is a risk of an undesired temporal change in the spacings between the blade tips and the casing internal wall, which can even lead to damage to the gas turbine. In this context, the gap adjustment means typically take the form of hydraulic shifting means in the region of the axial stops, and they permit precise-path displacement by means of hydraulic pistons in the region of the main and secondary tracks in the axial bearing. The means forhydraulic gap adjustment also comprise, in addition to these hydraulic shifting means, suitable closed- or open-loop control means via which a desired adjustment of the gap spacing can be undertaken.

On account of adjustment via the means for hydraulic gap adjustment, the expansion turbine can work more efficiently and can therefore achieve improved conversion of thermal energy into mechanical energy. Accordingly, this reduces the turbine outlet temperature of the exhaust gas when the turbine inlet temperature remains constant. If the gas turbine were now to be set to a constant turbine outlet temperature, it would by implication be necessary to raise the turbine inlet temperature insofar as a gap adjustment is or were to be undertaken.

In the case of operation at rated load, the consequence would be over firing of the gas turbine, with the possible consequence of damage to the first blade rows of the expansion turbine. In order to prevent such damage, prior to operation of the means for hydraulic gap adjustment, the operation of the gas turbine is always adjusted by means of an exhaust gas temperature control (ATK control) so as to reduce the turbine outlet temperature. Adjustment of that kind is normally performed by controlling the quantity of fuel that is supplied to the burner, whereby it is possible to ensure that the permissible turbine inlet temperature is not exceeded.

In that respect, the ATK control ensures that the turbine inlet temperature is set as low as possible in order to thus keep the material loading, in particular in the region of the first turbine stages, as low as possible. In addition, the ATK control also serves to make use of a maximum possible turbine inlet temperature in order to thus achieve a gas turbine efficiency that is as high as possible.

However, the disadvantage of these methods known from the prior art is that, primarily in the case of partial load, an ATK-controlled reduction in the turbine outlet temperature also simultaneously leads to an undesirable reduction in the efficiency of the gas turbine. Especially during start-up of a gas turbine, during which the turbine is in partial load operation, it is thus for example impossible to make full use of the gas turbine potential and the full efficiency.

SUMMARY OF INVENTION

In that regard, it is technically necessary to propose a proceeding method which is able to avoid or reduce the drawbacks which arise from the prior art. The object is therefore to propose an operating method which, during operation of the means for hydraulic gap adjustment, can simultaneously make improved efficiency possible.

This object, upon which the invention is based, is achieved by a method and by a gas turbine as claimed in the independent claims.

In particular, this object, upon which the invention is based, is achieved by a method for operating a static gas turbine at partial load with at least one compressor, at least one expansion turbine and a combustion chamber that is provided with at least one burner, which gas turbine further comprises means for hydraulic gap adjustment, wherein the method has the following steps:—operating the gas turbine at partial load;—operating the means for hydraulic gap adjustment;—while operating the means for hydraulic gap adjustment, increasing the fuel supply to the burner, raising the temperature of the combustion gases that are supplied to the expansion turbine, wherein in particular the temperature is below a predetermined upper temperature limit for rated load operation.

The object upon which the invention is based is also achieved by a static gas turbine with at least one compressor, at least one expansion turbine and a combustion chamber that is provided with at least one burner, which gas turbine further comprises means for hydraulic gap adjustment, wherein it also comprises a gas turbine closed-loop control unit that is designed to operate the gas turbine according to one of the methods above and/or described below.

It is to be noted at this point that the partial load operating range is to be understood in the present case as an operating range below the rated load operating range. In particular, the partial load range relates to the load range during start-up of a gas turbine from a relatively colder operating state before reaching the rated speed.

It is also to be noted that operation of the means for hydraulic gap adjustment can be understood as an active displacement procedure that typically takes place as a gap control. Equally, operation of the means is already present if gap adjustment with activated means has already been undertaken but without these means having been deactivated. In the case of control of this type, it can therefore occur, from time to time, that operating states of an adjustment alternate with operating states of maintenance operation, during which no adjustment takes place. The operation of the means for hydraulic gap adjustment can thus encompass all active operating states provided that the gap control has not been technically deactivated. In other words, operation of the means therefore does not require that adjustment of the gap spacing take place, but is already present when the relevant means are activated and thus gap adjustment could be undertaken at any moment.

It is also to be noted that the term 'combustion gases' relates to the gases flowing out of the combustion chamber before these have entered the expansion turbine. The temperature of the combustion gases therefore relates primarily to the temperature of those gases which determine the turbine inlet temperature.

The turbine inlet temperature can, for its part, in turn be approximately calculated from the turbine outlet temperature, on the basis of technical assumptions relating to the temperature drop during the passage through the expansion turbine. Thus, the measurable turbine outlet temperature can serve as an indicator for this turbine inlet temperature.

The present invention thus proposes a method during partial load operation, in which the fuel supply to the burners is increased during operation of the means for hydraulic gap adjustment. This increase in the fuel supply produces a richer combustion, and thus an increase in the temperature of the combustion gases that are supplied to the expansion turbine. In that respect, it is therefore possible, during operation of the means for hydraulic gap adjustment, to simultaneously increase the efficiency of the gas turbine, since increasing the temperature of the combustion gases also results in an increase in the turbine outlet temperature. In this context, it is essential to the invention that this operation takes place only under partial load since this makes it possible for overfiring to take place and thus for the maximum permissible turbine inlet temperatures to be exceeded. However, since the means for hydraulic gap adjustment are typically active during start-up of a gas turbine, that is to say in partial load operation, the combination of the two method steps can ensure particularly efficient gas turbine operation.

According to a first particularly advantageous embodiment of the method according to the invention, it is provided that a guide vane adjustment device of the gas turbine is adjusted while or after increasing the fuel supply, so as to additionally increase the temperature of the combustion gases. In this context, the guide vane adjustment device makes it possible to adjust the setting of the mass flow of air drawn in by the gas turbine, in that the axial position of the guide vanes covered by the guide vane adjustment device is advantageously adjusted. According to the embodiment, it is thus possible, for example, for the guide vane adjustment device to set a relatively small mass flow, resulting in the combustion in the combustion chamber becoming increasingly rich. However, this also increases the temperatures of the combustion gases that are supplied to the expansion turbine. The adjustment of the guide vane adjustment device is therefore an efficient supporting measure for increasing the gas turbine power during operation of the means for hydraulic gap adjustment.

According to another particularly advantageous aspect of the method according to the invention, it is provided that another step is included. This method step is: recording, by measurement, of a physical operating parameter which correlates with the temperature of the combustion gases in order to determine the latter, and initiating the increase in the fuel supply to the burner when the recorded value of the physical operating parameter exceeds a predetermined limit value. Such suitable physical operating parameters can for example be the gas turbine power or also the setting of the guide vane adjustment device. It is also possible to use the exhaust gas temperature as physical operating parameter, from which it is possible to draw conclusions relating to the temperature of the combustion gases at the turbine inlet. Thus, if for example a value of the turbine outlet temperature or exhaust gas temperature reaches a predetermined limit value (lower limit value), an instigation to increase the fuel supply to the burners can be undertaken. Consequently, the method according to the invention can be initiated by means of easily-determined variables.

According to an also advantageous embodiment of the method according to the invention, it is provided that the fuel supply to the burner and/or the setting of the guide vane adjustment device takes place such that the turbine outlet temperature at partial load is below the turbine outlet temperature at rated load. It is accordingly possible to prevent the maximum permissible temperatures for the turbine inlet temperature being exceeded. In particular, when the method is in operation, the starting point, the gradient during change and/or the maximum value of the physical operating parameter can be chosen so as to avoid overfiring of the gas turbine.

It can also be provided that increasing the fuel supply to the burner takes place in dependence on the setting of the guide vane adjustment device. The guide vane setting can thus be provided as a control parameter for the fuel supply.

It can alternatively or additionally be provided that increasing the fuel supply to the burner takes place in dependence on the ambient temperature and/or on the ambient pressure.

In the following, the invention is described in greater detail with reference to individual figures. In this context, it is to be noted that the figures are to be understood as merely schematic, and this permits no limiting effect with respect to the enablement.

It is also to be noted that those technical features that have the same reference sign have identical technical effects.

In addition, the technical features of the invention that are represented below are claimed in any combination with one another, insofar as this combination can solve the object of the invention.

DETAILED DESCRIPTION OF INVENTION

Figure 1:
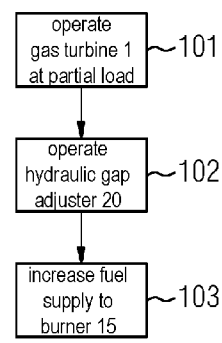
FIG. 1 shows a representation—in the form of a flow chart—of a first exemplary embodiment of the method according to the invention.
Figure 2:
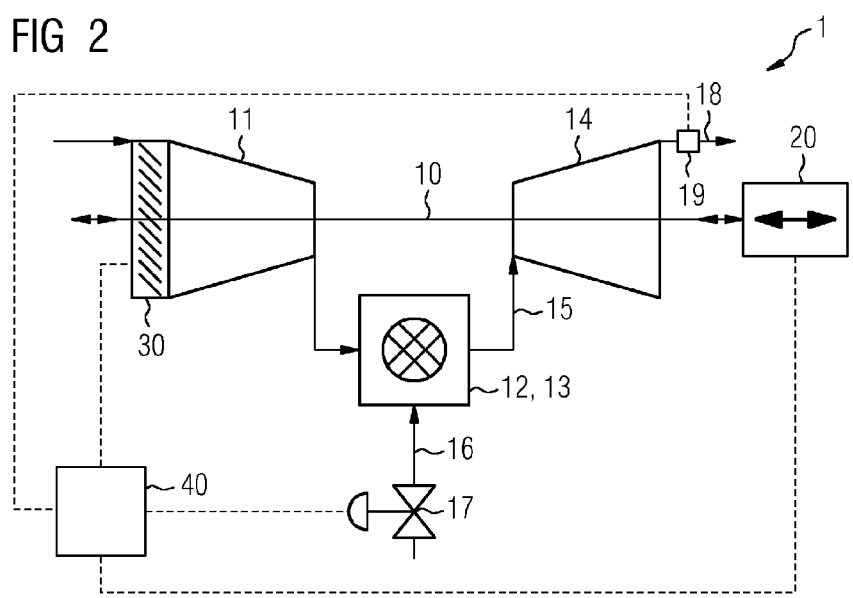
FIG. 2 shows a schematic circuit view of one embodiment of a static gas turbine according to the invention.

FIG. 1 shows a representation—in the form of a flow chart—of an embodiment of the method according to the invention for operating a static gas turbine 1 at partial load, wherein the gas turbine 1 is for example designed as depicted in FIG. 2. In this context, the gas turbine 1 has a compressor 11, at least one expansion turbine 14 and a combustion chamber 12 that is provided with at least one burner 13, and further comprises means 20 for hydraulic gap adjustment. In this context, the method according to the embodiment comprises the following three steps:—operating the gas turbine 1 at partial load (first method step 101);—operating the means 20 for hydraulic gap adjustment (second method step 102);—while operating the means 20 for hydraulic gap adjustment, increasing the fuel supply to the burner 13, raising the temperature of the combustion gases 15 that are supplied to the expansion turbine 14 (third method step 103).

FIG. 2 shows an embodiment of the static gas turbine 1 according to the invention with a compressor 11, an expansion turbine 14, and at least one burner 13 that cooperates for combustion with a combustion chamber 12. The gas turbine 1 further comprises means 20 for hydraulic gap adjustment that are designed to shift the gas turbine rotor 10, that connects the compressor 11 and the expansion turbine 14, in the axial direction.

As set out above, the gas turbine rotor 10 is shifted such that, in the process of the desired adjustment, the turbine blade tips (not shown here) have a smaller gap spacing with respect to the inner casing wall of the expansion turbine 14. The reduction in the gap spacing results in reduced fluid dynamic losses (the gas that flows along the internal surface would otherwise not contribute to the expansion work in the expansion turbine 14), such that the power output of the gas turbine 1 is improved.

Therefore, if the gas turbine 1 is operated at partial load, with the means 20 for hydraulic gap adjustment being in operation at the same time, it is possible to increase the fuel supply to the burner 13 via the fuel line 16. According to the embodiment, this increase is taken in charge by a gas turbine closed-loop control unit 40 that cooperates with a fuel valve 17 which is connected into the fuel line 16.

At the same time, the gas turbine closed-loop control unit 40 is in communication with the means 20 for hydraulic gap adjustment, and with a guide vane adjustment device 30 in the region of the inlet of the compressor 11, and with a temperature sensor 19 that interacts with the exhaust gas stream of the gas turbine 1 such that the exhaust gas temperature or the turbine outlet temperature can be recorded by measurement.

According to the embodiment, the temperature sensor 19 is connected into an exhaust gas line 18 which conducts the exhaust gases issuing from the expansion turbine.

If the gas turbine closed-loop control unit 40 now detects activation or operation of the means for hydraulic gap adjustment, or if the gas turbine closed-loop control unit 40 initiates operation of the means 20 for hydraulic gap adjustment, the fuel supply to the burner 13 is undertaken by suitable adjustment of the fuel valve in the fuel line 16. In particular, the fuel supply is increased.

Initiation of the increase in the fuel supplied to the burner 13 takes place, according to the embodiment, in particular if a physical operating parameter is recorded that correlates with the temperature of the combustion gases 15 for determining the latter. In particular, this can be the setting of the guide vane adjustment device 30 or the exhaust gas temperature that is recorded by means of the temperature sensor 19 in the exhaust gas line 18.

According to an alternative embodiment of the invention, it can also be provided that the guide vane adjustment device of the gas turbine 1 is additionally set during operation of the means 20 for hydraulic gap adjustment.

This change can also for example be initiated, in terms of closed- or open-loop control, by the gas turbine closed-loop control unit 40.

According to the embodiment, the gas turbine closed-loop control unit 40 can also be designed as a gas turbine open-loop control unit 40.

Both forms of the adjustment are to be encompassed by the gas turbine closed-loop control unit 40.

Further embodiments are to be found in the subclaims.

The invention claimed is:

1. A method for operating a static gas turbine at partial load with at least one compressor, at least one expansion turbine and a combustion chamber that is provided with at least one burner, wherein the gas turbine further comprises a hydraulic gap adjuster, wherein the method comprises:
   operating the gas turbine at partial load;
   operating the hydraulic gap adjuster during partial load to shift a gas turbine rotor that connects the at least one compressor and the at least one expansion turbine in an axial direction, such that turbine blade tips of the at least one expansion turbine are displaced to have a smaller gap spacing with respect to an inner casing wall of the at least one expansion turbine;
   while operating the hydraulic gap adjuster, increasing a fuel supply to the at least one burner, raising a temperature of combustion gases supplied to the at least one expansion turbine, wherein the temperature of the combustion gases is below a predetermined upper temperature limit for rated load operation.

2. The method as claimed in claim 1, further comprising:
   adjusting a guide vane adjustment device of the gas turbine while or after increasing the fuel supply to additionally increase the temperature of the combustion gases.

3. The method as claimed in claim 1, further comprising:
   recording, by measurement, of a physical operating parameter which correlates with the temperature of the combustion gases in order to determine the temperature of the combustion gases, and
   initiating the increase in the fuel supply to the at least one burner when a recorded value of the physical operating parameter exceeds a predetermined limit value.

4. The method as claimed in claim 1, wherein increasing the fuel supply to the at least one burner takes place in dependence on an ambient temperature and/or on an ambient pressure.

5. The method as claimed in claim 2, wherein increasing the fuel supply to the at least one burner and/or the adjusting of the guide vane adjustment device takes place such that a turbine outlet temperature at partial load is below a turbine outlet temperature at rated load.

6. The method as claimed in claim 2, wherein increasing the fuel supply to the at least one burner takes place in dependence on a setting of the guide vane adjustment device.

* * * * *